Patented Aug. 22, 1939

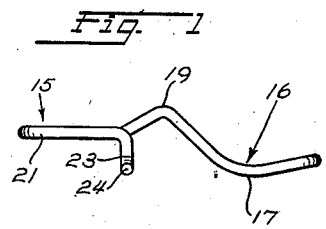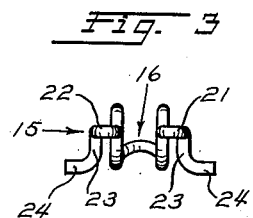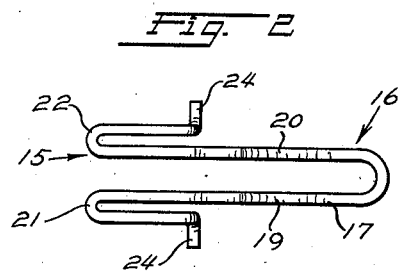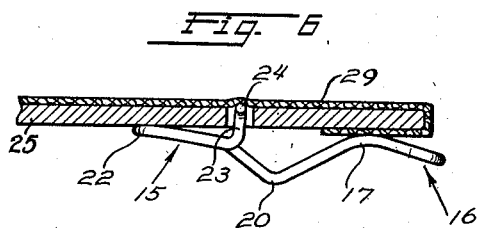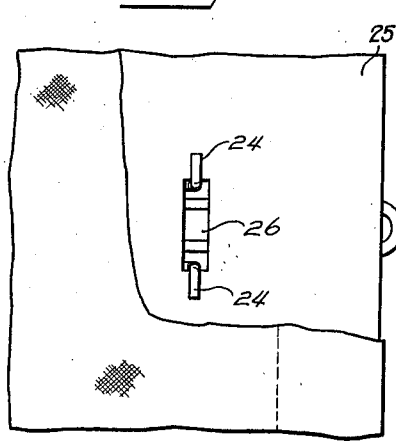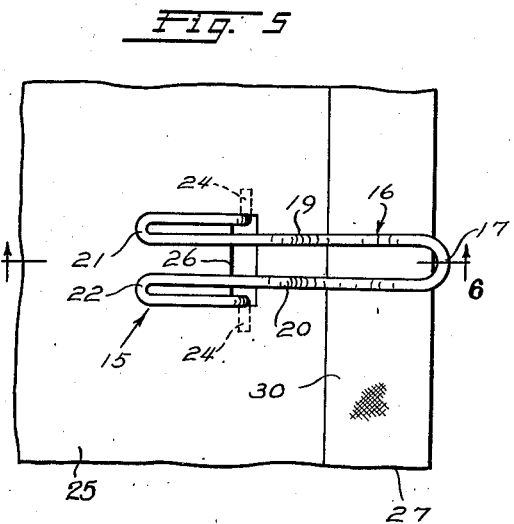

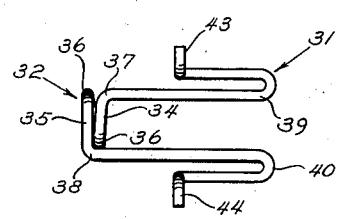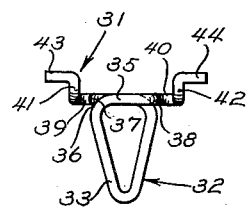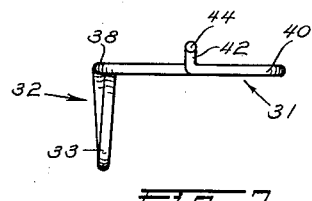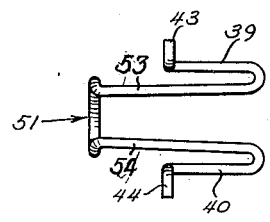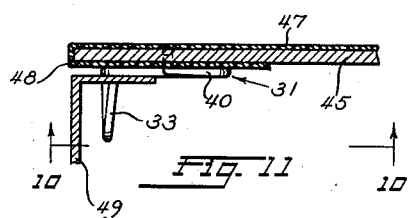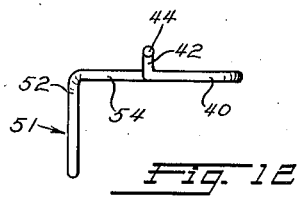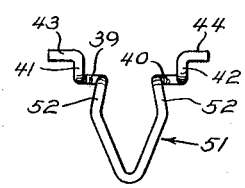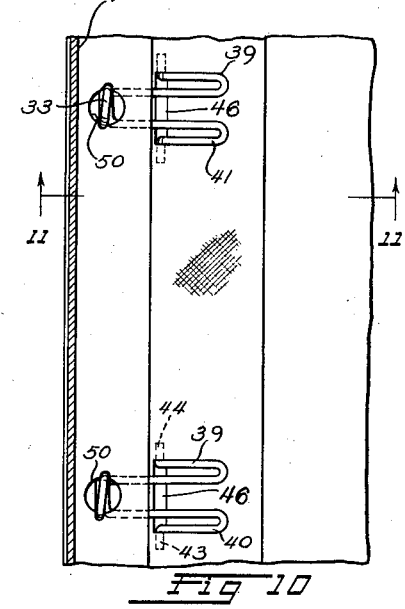

2,170,483

UNITED STATES PATENT OFFICE 2,170,483

FASTENER

Bion C. Place, Detroit, Mich., assignor of one-half to George E. Gagnier, Detroit, Mich.

Application April 27, 1938, Serial No. 204,660

9 Claims. (Cl. 24—261)

The present invention relates to fasteners intended particularly to secure trim panels or the like to the interior of automobile or similar bodies. More particularly, the invention is concerned with a fastener for securing trim panels that is constructed from a single piece of wire in a form capable of ready interlocked engagement with the foundation of the panel from the uncovered side thereof.

The primary purpose of the present invention is to provide a trim panel fastener, constructed so as to permit it to be engaged with the foundation of the trim panel by hooking the fastener thereon through an opening in the foundation, and designed so that the fastener will engage both sides of the foundation and distribute any strains, to which the fastener may be subjected, over a relatively large area of the foundation adjacent said opening.

A still further object of the invention is to provide a fastener having an attaching part, and a frame engaging part, in which the attaching part is formed to permit convenient assembly of the fastener to the foundation of a trim panel through an opening therein by a compression and subsequent expansion of the attaching part after it has been associated with the foundation.

Still another object of the invention is to provide a trim panel fastener constructed from a single piece of wire so that the ends of the piece of wire form the attaching part of the panel fastener and so that the mid-portion of the wire forms the frame engaging part, in which the attaching part includes a pair of spaced loops each of which carries a hook-like projection designed to pass through an opening in the foundation of the panel and engage the covered side thereof, the loops being resiliently connected by the part of the fastener that is intended to engage the part to which the panel is applied.

A still further object of the invention is to provide a trim panel fastener of the type that is intended to be assembled with respect to the foundation through an opening therein in which the part of the fastener that is engaged with the foundation through said opening engages the foundation over areas extending laterally of every side of the opening.

Still further objects of the invention will appear as a description thereof proceeds with reference to the accompanying drawings in which:

Figures 1, 2 and 3 are respectively side, top and end views of a trim panel fastener, including the present invention, of the type in which the frame engaging part merely laps the frame when the fastener is in holding position;

Figures 4 and 5 are respectively top and bottom plan views of a fragment of a trim panel showing how the fastener of Figures 1, 2 and 3 is associated therewith;

Figure 6 is a sectional view taken on a plane indicated by the line 6—6 in Figure 5 looking in the direction of the arrows;

Figures 7, 8 and 9 are respectively side, plan, and end views of a modified form of spring fastener of the stud type;

Figure 10 is a view of fragment of a trim panel applied to a supporting structure by means of the fastener of Figures 7, 8 and 9, said view being taken on the plane indicated by the line 10—10 in Figure 11 looking in the direction of the arrows;

Figure 11 is a sectional view taken on the plane 11—11 of Figure 10 and

Figures 12, 13 and 14 are respectively, side, plan and end views of a still further modified fastener of the stud type including the present invention.

Like reference characters indicate like parts throughout the several figures.

Referring to Figures 1, 2 and 3, the fastener there shown includes an attaching part 15 and a frame engaging part 16. The frame engaging part is formed from the mid-portion of a single piece of wire by bending it into U-shaped form thus providing a tongue 17 intended to lap the frame to which the panel is attached in the manner fully shown and described in my Patent No. 2,093,734, granted September 21, 1937. The end of the tongue 17 is curved upwardly to facilitate engagement of the fastener with the frame. The two legs of the U forming the tongue 17 are also bowed upwardly as indicated at 19 and 20 to increase the resilience of the tongue 17 and to provide ample clearance between the under side of the panel and the fastener when the latter is applied thereto in the manner presently to be described.

The attaching part of the fastener includes two U-shaped loops 21 and 22, one leg of each of the latter U-shaped loops being formed as a continuation of the legs of the loop forming the tongue 17 so that the tongue 17 serves to resiliently connect said loops 21 and 22 together. Loops 21 and 22 each carry an upstanding straight portion 23 and each straight portion 23 carries a finger 24 formed from an extreme end of the piece of wire, the fingers 24 extending at right angles to the straight portion 23.

The way in which the one-piece wire spring fastener just described is used is illustrated in Figures 4, 5 and 6 in which 25 designates a fragment of a trim panel foundation having an elongated opening 26 formed therein adjacent a margin 27 thereof. The trim panel is provided with a fabric or like upholstery cover 29 that is folded around the margin of the foundation, as indicated at 30, in the manner well understood in the art, the fabric cover 30 concealing the openings 26 in the foundation.

The fastener is applied to the panel, after it has been completely constructed and covered, by interlocking the fastener to the foundation through the opening 26 therein. Of course, it will be understood that the foundation is provided with as many openings as fasteners. In order to interlock the fasteners to the foundation the hook-like projections, consisting of the straight portion 23 and the fingers 24, are moved toward each other by pressing the loops 21 and 22 towards each other, thus contracting them and the loop 17, so that the fingers 24 may be passed throughout the opening 26. When said fingers are adjacent the cover 29 the pressure holding the loops 21 and 22 close together is relieved, and the attaching part of the fastener is permitted to expand, bringing the fingers 24 into contact with the side of the foundation adjacent the covering material at the ends of the elongated openings 26. The fastener is preferably so constructed that, in assembled position, the straight portions 23 bear against the ends of the slot so that when the fingers engage the covered side of the foundation the loops 21 and 22 bear firmly against the underside of the foundation. The fastener is preferably so constructed that when it has been assembled with respect to the panel, the tongue 17 bears firmly against the margin of the panel making it necessary to wedge the frame between the tongue 17 and the panel against the resilience of the legs of the tongue in securing the panel to the frame in the manner described in the patent above referred to.

Referring to the modification of the invention illustrated in Figures 7, 8 and 9 of the drawings, the one-piece wire fastener there shown includes an attaching part 31 and a frame engaging part 32. The frame engaging part comprises a shank or stud 33, formed by bending the mid-portion of the piece of wire into the form of an elongated or oval loop. The portions 34 and 35 of the wire, that serve to connect the shank or stud 33 to the attaching part 31 are crossed, as indicated in Figure 9, providing relatively sharp holding shoulders 36 close to the attaching part 31. Right angular bends 37 and 38 are then formed in the portion of the wire, beyond the portions 34 and 35, to dispose the ends of the wire in a plane normal or approximately normal to the plane of the loop 33. The attaching part 31 of the fastener is formed from said ends.

Attaching part 31 comprises two U-shaped loops 39 and 40 spaced substantially apart as illustrated, said loops being thus yieldingly connected together by the depending loop 33. Loops 39 and 40 each carry upstanding portions 41 and 42 provided respectively with laterally extending fingers 43 and 44, said upstanding portions and fingers corresponding in function and structure to the portions 23 and 24 of the fastener first described.

The manner in which the fastener of Figures 7, 8 and 9 is used is made clear by Figures 10 and 11, in which 45 designates the foundation of a trim panel provided with openings 46 to permit the fasteners to be interlocked with respect thereto from the uncovered side thereof. The foundation 45 has one side covered by a fabric or suitable upholstery covering material 47, which is folded around the edges of the foundation as indicated at 48 in the manner well understood in the art. Openings 46 are provided at the points of the foundation at which fasteners are to be applied, and after the panel has been covered the fasteners are asembled with respect to the foundation by compressing the attaching part of the fastener by moving the loops 39 and 40 towards each other so as to permit the passage of fingers through the openings 46 in order to bring them between the fabric and the covered side of the foundation in the manner already described with the form of the invention illustrated in Figures 4, 5 and 6. Preferably the fastener is so designed that the attaching part is compressed somewhat when in applied position so that the portions 41 and 42 bear against the ends of the openings 46 with yielding pressure, thus insuring an absence of play between the fastener and the foundation. While the openings 46 are shown as elongated slots, and openings of this character are preferred, it will be understood that openings of other forms may be used.

After as many fasteners have been assembled with respect to the foundation as are required, the panel is then applied to the support 49 by entering the protruding shanks or studs 33 in the openings 50 provided in the supporting structure in a manner well understood in the art. In holding position it will be observed that the shoulders 36 engage the inner surface of the supporting structure adjacent each opening 50. In view of the fact that said shoulders are sharply defined the fastener has unusual holding power.

In the form of the invention illustrated in Figures 12, 13 and 14 the stud part 51 is modified by bending the midportion of the wire into the form of an open loop of generally diamond-shaped or oval form providing holding shoulders 52 adjacent the attaching part of the fastener, which is constructed in exactly the same form as that of the previously described fasteners. The portions of the wire 53 and 54 between the stud part 51 and the loops 39 and 40 extend directly inward in this form of the invention without crossing. In other respects the fastener of Figures 12, 13 and 14 is exactly the same as that of Figures 7, 8 and 9 and it is used in the manner already described with particular reference to Figures 10 and 11.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A one-piece wire fastener having a part to secure it to the foundation of a trim panel or the like, said part consisting of two spaced U-shaped portions disposed in parallelism, a straight portion extending perpendicularly from each U-shaped portion, and a finger formed by a wire end and extending laterally of each straight portion in a plane spaced from the plane of said U-shaped portions, and a part including the mid-portion of said piece of wire to engage the structure to which the panel is to be attached, said last-named part resiliently uniting said U-shaped portions.

2. A one-piece wire fastener having a part to secure it to the foundation of a trim panel or the like, said part consisting of two spaced U-shaped portions disposed in parallelism, a straight portion extending perpendicularly from each U-shaped portion, and a finger formed by a wire end and extending laterally of each straight portion in a plane spaced from the plane of said U-shaped portions, and a loop resiliently uniting said U-shaped portions, said loop constituting the part of the fastener to engage the structure to which the panel is to be attached.

3. A one-piece wire fastener having a part to secure it to the foundation of a trim panel or the like, said part consisting of two spaced U-shaped portions disposed in parallelism, a straight portion extending perpendicularly from each U-shaped portion, and a finger formed by a wire end and extending laterally of each straight portion in a plane spaced from the plane of said U-shaped portions, and a stud to engage an opening in a structure to which the panel is to be attached, consisting of a loop formed from the mid-portion of said piece of wire and crossed wire portions adjacent one end of said loop, said crossed portions each carrying one of said shaped portions.

4. In combination, a trim panel foundation having an elongated opening therein, and a fastener interlocked with said foundation through said opening, said fastener having portions that extend in opposite directions from the longer sides of said opening and engage one side of said foundation, portions that pass through said opening and further portions that engage the other side of said foundation and extend in opposite directions from the short sides of said opening.

5. In combination, a trim panel foundation having an opening, and a fastener to secure the trim panel to its support associated with said foundation through said opening, said fastener having portions extending across said opening and engaging said foundation at one side thereof, and further portions carried by said first-named portions and engaging said foundation at the other side thereof and extending in a direction transverse to said first named portions, said first named portions being yieldably connected by the part of the fastener that engages said support to permit relative movement of said first-named portions in order to pass said last-named portions through said opening.

6. A one-piece wire fastener comprising an attaching part and a frame engaging part, the attaching part including the ends of the piece of wire and the frame engaging part comprising the mid-portion of the piece of wire, said attaching part including two laterally spaced U-shaped loops, each of said loops carrying a laterally projecting finger disposed in a plane parallel to and spaced from the plane of said loops, said frame engaging part consisting of a loop that resiliently unites said first-named loops.

7. A one-piece wire fastener comprising an attaching part and a frame engaging part, the attaching part including the ends of the piece of wire and the frame engaging part comprising the mid-portion of the piece of wire, said attaching part including two laterally spaced loops, each of said loops carrying a laterally projecting finger disposed in a plane parallel to and spaced from the plane of said loops, said frame engaging part consisting of a loop in a plane normal to said first-named loops resiliently uniting said loops.

8. A one-piece wire fastener comprising an attaching part and a frame engaging part, the attaching part including the ends of the piece of wire and the frame engaging part comprising the mid-portion of the piece of wire, said attaching part including two laterally spaced loops, each of said loops carrying a laterally projecting finger disposed in a plane parallel to and spaced from the plane of said loops, said frame engaging part consisting in a loop in a plane normal to said first-named loops resiliently uniting said loops through crossed portions of the wire.

9. A spring fastener comprising an attaching part and a frame engaging part, said attaching part consisting of two separated portions disposed in one plane and two separated other portions attached respectively to said last named portions and disposed in a plane parallel to and spaced from said first-named plane, said other portions extending in opposite directions, and said frame engaging part consisting in resiliently united portions respectively carrying said separated portions whereby contraction and expansion of said attaching part may occur.

BION C. PLACE.